Dec. 26, 1961 E. A. HENNINGSEN ETAL 3,014,729
MATERIAL-CARRYING IMPLEMENT WITH CRANKED SHAFT
INTERMITTENTLY DRIVING THE CARRIER
Filed May 2, 1960 4 Sheets-Sheet 1

INVENTORS
E. A. HENNINGSEN &
A. E. KLOUDA
ATTORNEYS

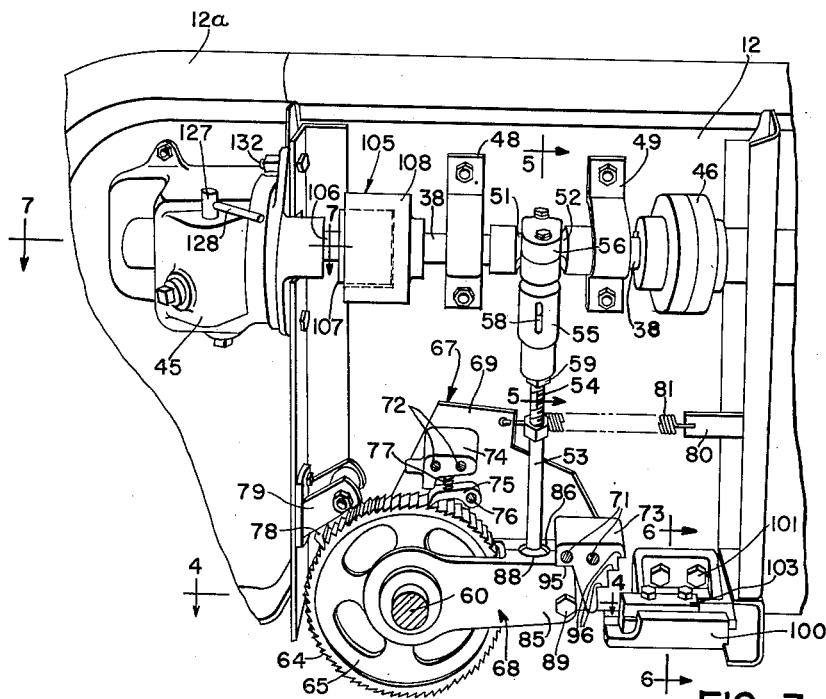

Dec. 26, 1961 E. A. HENNINGSEN ETAL 3,014,729
MATERIAL-CARRYING IMPLEMENT WITH CRANKED SHAFT
INTERMITTENTLY DRIVING THE CARRIER
Filed May 2, 1960 4 Sheets-Sheet 3
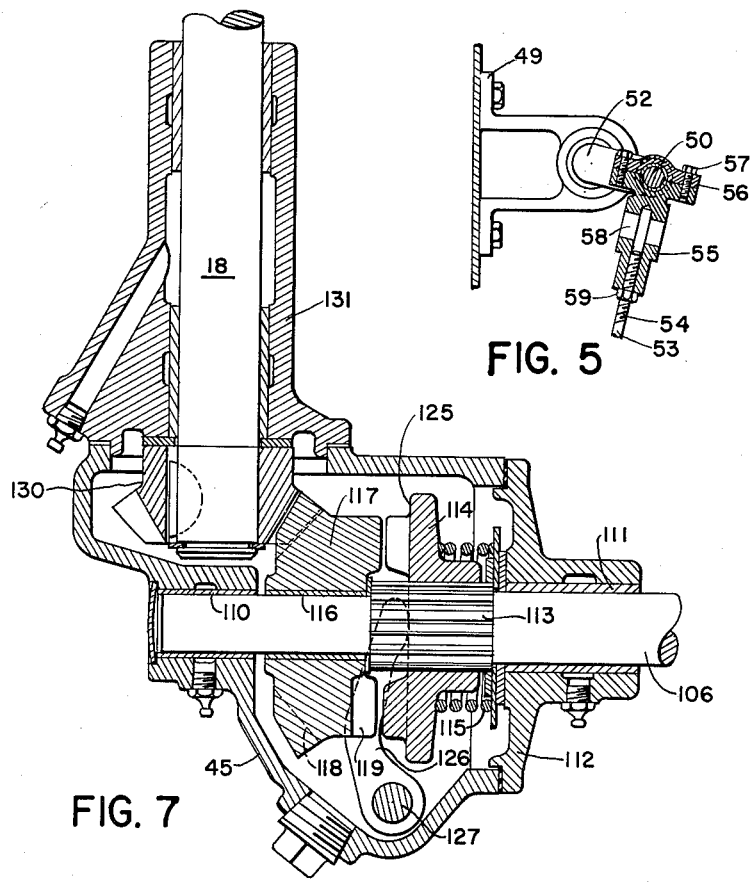
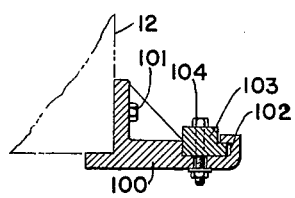
INVENTORS
E.A. HENNINGSEN &
A.E. KLOUDA
BY C. Parker and W.A. Murray
ATTORNEYS Dec. 26, 1961 E. A. HENNINGSEN ETAL 3,014,729
MATERIAL-CARRYING IMPLEMENT WITH CRANKED SHAFT
INTERMITTENTLY DRIVING THE CARRIER
Filed May 2, 1960 4 Sheets-Sheet 4

INVENTORS
E.A.HENNINGSEN &
A.E.KLOUDA
BY
ATTORNEYS

United States Patent Office 3,014,729
Patented Dec. 26, 1961

3,014,729
MATERIAL-CARRYING IMPLEMENT WITH CRANKED SHAFT INTERMITTENTLY DRIVING THE CARRIER
Edar A. Henningsen, Geneseo, and Alvin E. Klouda, Moline, Ill., assignors to Deere & Company, Moline, Ill., a corporation of Delaware
Filed May 2, 1960, Ser. No. 26,191
17 Claims. (Cl. 275—6)

This invention relates to a material unloading implement and more particularly to the type of material unloading implement which is pulled behind a tractor and receives power for its operating mechanism from a power take-off shaft on the tractor.

In a material unloading type implement of the type herein to be described, there is provided a mobile body having a container mounted thereon with front and rear ends and oppositely disposed longitudinally extending sides interconnected by a floor. One end of the container is open for the discharge of material and a floor conveyor is provided to engage and advance the material towards the outlet or discharge end of the conveyor. Normally there is provided a beater at the discharge end which both pulverizes and feeds the material outwardly through the discharge end.

It is proposed and is the main object of the present invention to provide a material unloader shown as a manure spreader type implement which is adaptable for attachment to a tractor and receives its power from the power takeoff shaft of the tractor. The beater mechanism at the rear of the spreader receives its power from an elongated fore-and-aft extending shaft which extends from the forward end of the spreader to the rear end and is connected to the beater by means of a bevel gear transmission. Extending from the forward end of the longitudinal drive shaft and across the forward end of the spreader container or box is a speed reduction drive which operates to both drive the longitudinal drive shaft as well as to reduce rotation of the drive shaft to a normal rate. It is proposed to incorporate in the fore-and-aft or longitudinally extending drive shaft an eccentric or crank section on which is mounted a vertically disposed connecting rod. The lower end of the connecting rod is attached to a pawl carrier which in turn engages a ratchet wheel for intermittently advancing the floor conveyor.

It is another object of the invention to provide a material unloader type implement as above described in which the entire beater mechanism may be easily attached and detached for purposes of connecting the unit to and disconnecting it from a self-unloading wagon.

It is still a further object or proposal of the present invention to incorporate in the above-described type of drive an adjusting means of a new and novel nature which is incorporated in the pawl and ratchet drive and which may be adjusted to vary the rate or amount of feed of the floor conveyor.

Other objects and advantages of the present invention will become apparent to those skilled in the art as the nature of the invention is better understood from the following description and as shown in the acompanying drawings.

FIG. 3 is an enlarged view showing the rear portion of the material unloader and particularly the drive mechanisms operating the beaters and floor conveyor with portions thereof removed to show internal mechanism.

FIG. 4 is an enlarged sectional view taken substantially along the line 4—4 of FIG. 3.

FIG. 5 is a sectional view taken substantially along the line 5—5 of FIG. 3.

FIG. 6 is an enlarged sectional view taken along the line 6—6 of FIG. 3.

FIG. 7 is an enlarged sectional view taken substantially along the line 7—7 of FIG. 3.

Figure 1:
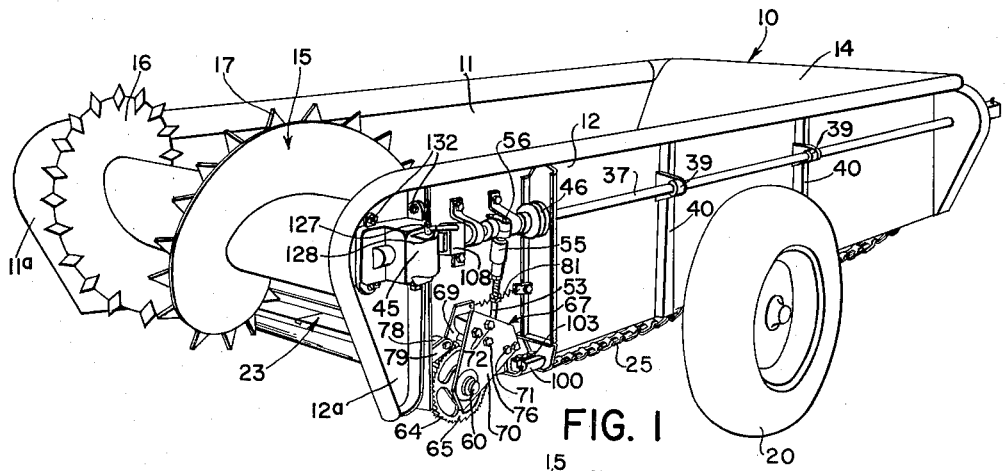
FIG. 1 is a rear and side perspective of the material unloader which incorporates the features of the present invention.

Referring now to FIG. 1, there is provided a mobile fore-and-aft extending container or box 10 having oppositely disposed fore-and-aft extending side walls 11, 12 interconnected at their lower edges by a floor 13 and at their front by an upright transverse front wall 14. The rear end of the container or box 10 is left open to provide a material discharge outlet. Disposed across the open rear end is a combination beater-widespread 15 contacting material feeding rearwardly and dispatching the material both laterally outwardly and rearwardly of the container 10. Details of the widespread are unimportant and may generally be described as having a flight means 16 thereon with teeth 17 adjacent the outer edge of the flights which both contacts, beats, and separates the material as the material comes in contact with them. The widespread 15 is mounted on a transverse drive shaft 18 (FIG. 7) which is carried at opposite ends on the respective side walls 11, 12.

The container 10 is supported at its rear by a pair of transversely spaced supporting wheels, one of which is shown at 20 and at its forward end by a rigidly forwardly projecting tongue or connecting structure 21 which may be attached to the drawbar of a tractor through a clevis type connection shown only partially at 22. A stand 19 is provided to support the tongue 21 when not attached to the tractor. Advancing means in the form of a floor conveyor 23 positioned inside of the container operates to move material from front to rear within the container 10. The conveyor is of conventional type having a pair of transversely spaced chains 24, 25 which move along the edges of the floor 13 and are interconnected by transverse flights 26 which engage the under surface of the material. The chains 24, 25 are carried on sprockets, two of which are shown at 27, 28 at the front and the rear of the container.

Figure 2:
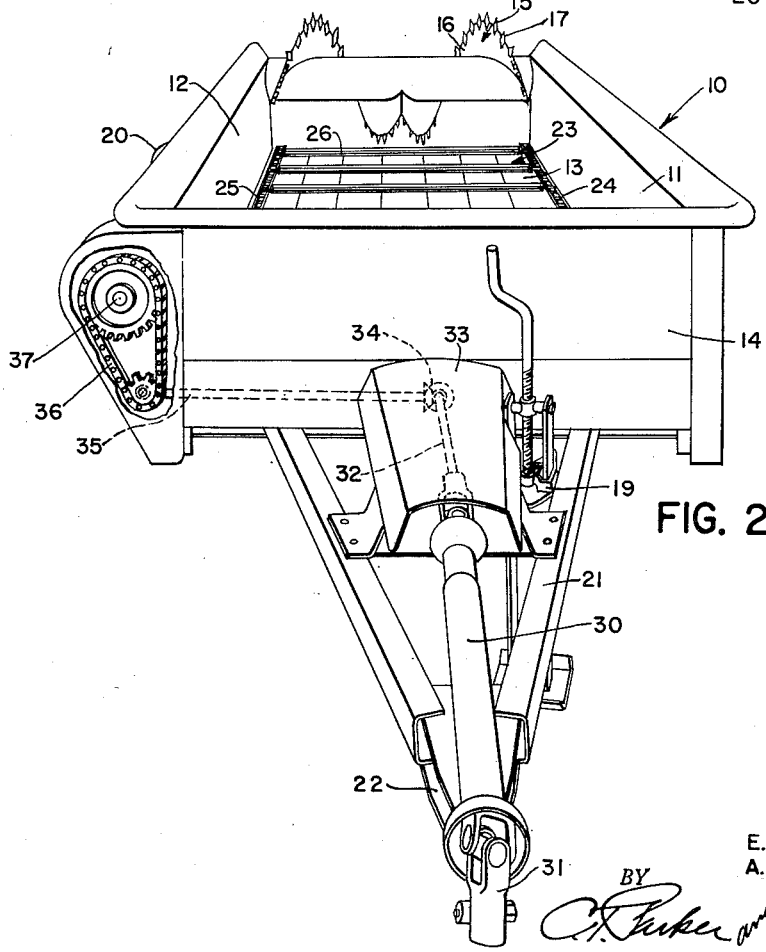
FIG. 2 is a front perspective view of the material unloader shown in FIG. 1 with portions thereof removed to show internal mechanism.
Figure 8:
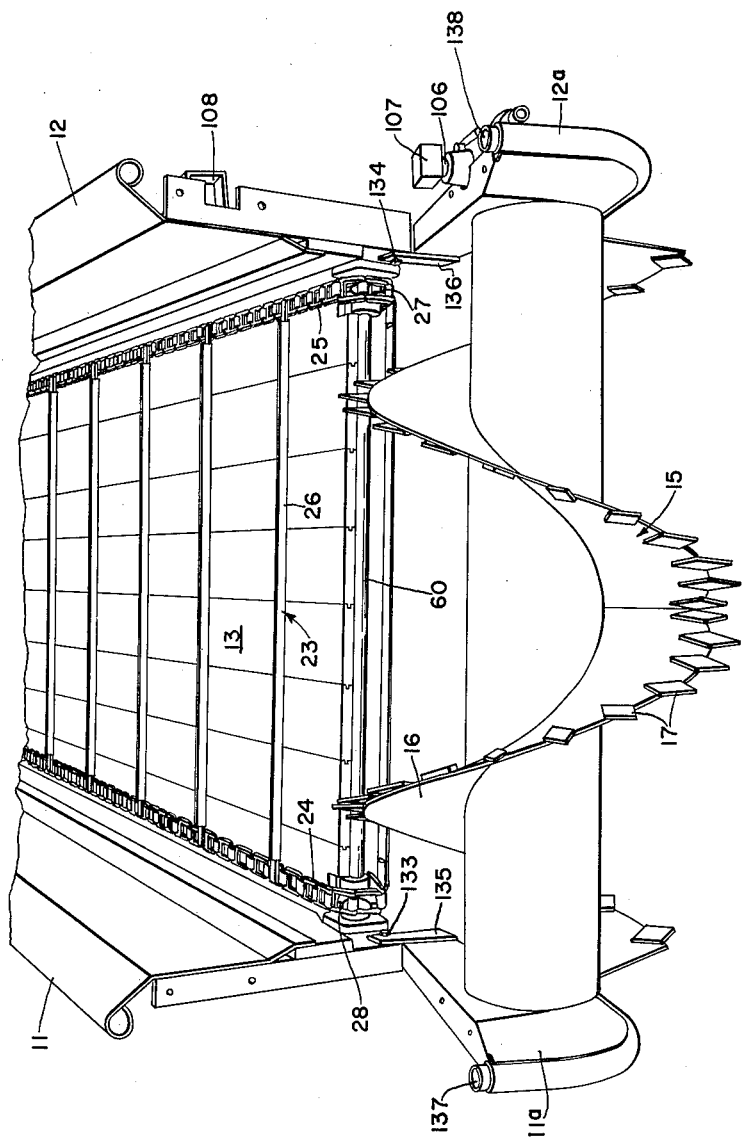
FIG. 8 is a rear perspective view with the rear extension of the unloader lowered as would occur during assembling of the unit.

The power for operating the present material unloader is received from the power take-off shaft of a tractor through a longitudinally extending telescopic type drive shaft 30 having a forwardly disposed articulate coupling 31 adaptable to fit on the power take-off shaft, not shown, on the tractor. The rear end of the drive shaft 30 is connected to a fore-and-aft extending intermediate drive shaft, shown only in dotted representation at 32 in FIG. 2, carried under a shield 33 and connected at its rear end to a bevel gear transmission 34. The bevel gear transmission 34 drives a transverse drive shaft 35 which extends outwardly to the side of the spreader and to a bevel gear transmission which operates a speed-reducing chain drive, indicated in its entirety by the reference numeral 36, the latter driving a fore-and-aft extending main drive shaft 37. The present drive from the power take-off shaft to the main shaft 37 is shown only as representative, it being recognized that other drives would operate for the same purpose. It should, however, be understood that there is a considerable speed-reduction provided so that the ultimate rate of rotation of the shaft 37 is considerably slower than that of the power take-off shaft.

The shaft 37 is carried on the side wall 12 in journals 39 supported on upright structural members 40 on the side of the wall 12. Generally, for reasons later to become apparent, the journals 39 support the shaft 37 some distance from the adjacent side wall 12. A rear shaft portion or extension 38 of the drive shaft 37 is supported in a gear transmission housing, indicated in its entirety by the reference numeral 45, the gear housing having journals therein for supporting the extension 38. The rear extension 38 is connected to the rear end of the main drive shaft 37 by a coupling 46 of conventional type so that the rear extension 38 will rotate in unison with the shaft 37. A pair of supports 48, 49 carrying journal blocks for the shaft portion 38 is bolted to the side wall 12.

The straps 48, 49 also support the shaft portions 38 some distance from the face of the wall 12 so that the drive shaft extension 38 is spaced from the wall. The drive shaft 38 has thereon a crank section or portion 50 eccentric to the axis of the shafts 37, 38. The crank section 50 is rigid with the shaft extension 38 and is connected thereto by means of a pair of crank arms 51, 52. Depending from the crank portion 50 is a connecting rod 53 having its upper end threaded at 54. The rod 53 is threadedly connected to the lower end of a coupling shank 55 which has its upper end journaled to receive the under side of the crank section 50. The journal 55 is connected for rotation to the crank section 50 by means of an upper overlying journal section 56 bolted to the lower section 55 by bolts 57. The connecting rod 53 will therefore move in conventional manner and will respond to rotation of the shaft 37 to reciprocate vertically.

A slot 58 is provided in the lower coupling 55 for purposes of adjusting the section 55 on the rod 54 and a lock nut 59 is provided for purposes of locking the rod 53 in its correct position.

Referring to FIG. 4, a transverse shaft 60 having the sprocket 27 thereon operates the floor conveyor 23. The shaft 60 extends completely across the container and extends through both walls 11, 12. Journal means such as at 61 carried in a journal housing 62 support the shaft 60 for rotation on the walls 11, 12. A keyway 63 is provided to lock the sprocket 27 on the shaft 60. A similar arrangement although not shown is provided for the sprocket on the opposite end of the shaft 60. Consequently, rotation of the shaft 60 will cause the floor conveyor 23 to move.

Supported in fixed relation to the shaft 60 and outboard of the walls 12 is a ratchet wheel 65 having ratchet teeth 64. A hub 66 of the ratchet wheel extends axially along the shaft 60 and is provided with outer cylindrical surfaces for receiving for relative rotation thereto a pawl carrier, indicated in its entirety by the reference numeral 67, and a drive arm, indicated in its entirety by the reference numeral 68.

The pawl carrier 67 includes a pair of radially extending plates 69, 70, having openings for receiving the hub 66 and extending radially on opposite sides of the ratchet wheel 65. The plates 69, 70 extend radially beyond the outer edge or teeth 64 of the ratchet wheel 65 and are interconnected by bolts 71, 72 extending through spacers 73, 74 respectively which maintain proper spacing between the plates 69, 70. A pawl 75 is carried on a bolt 76 extending through both plates with the end of the pawl 75 engaging the teeth 64 on the ratchet wheel 65. A spring 77 extends downwardly from the spacer 74 to the back of the pawl 75 for purposes of maintaining the pawl in engagement with the teeth 64. As is conventional in pawl and ratchet wheel drives, the pawl 75 will drive the ratchet wheel 65 only when the pawl carrier 67 moves in a counterclockwise direction, as viewed in FIG. 3, and will merely pass over the teeth when the pawl carrier moves in a clockwise direction. A stop pawl 78 mounted on brackets 79 secured to the side 12 of the unloader will engage the ratchet wheel 65 so as to prevent clockwise rotation of the ratchet wheel. Also connected to the wall 12 is a rearwardly projecting bracket 80 which carries a spring 81 extending rearwardly and connected at its rear end to the inner pawl-carrier plate 69. The spring 81 operates as a biasing force drawing the pawl carrier 67 in a clockwise direction.

The drive arm 68 is composed of two radially extending arm pieces 84, 85 disposed on opposite sides of the ratchet wheel 65 with each arm piece 84, 85 being molded to provide half a socket, as at 86, 87 which fits about a lower ball portion 88 on the connecting rod 53. The two arm pieces 84, 85 are bolted together at 89 and when bolted together provide a socket joint for the lower ball end 88 of the connecting rod 53. Consequently, there is an articulate connection between the connecting rod 53 and the drive arm 68. It is therefore obvious that the drive arm 68 may move relative to the pawl carrier 67 as well as relative to the hub 66 of the ratchet wheel 65 upon rotation of the shaft extension 38.

The spacer 73 is provided with a rearwardly projecting portion which provides an undershelf at 95, disposed in contacting relation to the upper surface of the drive arm 68. By contacting the undershelf 95, the arm 68, upon moving in an upward direction, will drive the pawl carrier 67 counterclockwise which in turn will drive ratchet wheel 65. Consequently, when the crank portion 52 is rotated, the connecting rod 54 will drive the drive arm 68 upwardly and downwardly and in its upward stroke will drive the pawl carrier 67 and the conveyor shaft 60. The spring 81 will then draw the carrier 67 in a clockwise direction or in a non-operative direction as the drive arm 68 moves downwardly.

Referring specifically to FIG. 3, it will be noted that the spacer 73 is provided with a plurality of undershelves 96 laterally disposed and facing downwardly and on the forward end of the spacer 73. Means for adjusting the amount of bite by the pawl 75 and consequently the rate of movement of the floor conveyor is provided just forwardly of the spacer 73. The adjusting means includes a guide track structure 100 bolted at 101 to the side wall 12 and having thereon a longitudinal track 102 which will receive a guide 103. The guide 103 may be moved forwardly or rearwardly in the track 102 and disposed to have its rear upper surface contact one of the steps or shelves 96. By adjusting the guide 103 rearwardly, it becomes apparent that the upper surface will move under the lower step and consequently the spring 81 will move the pawl carrier 67 downwardly only until the lower step or shelf contacts the upper surface of the guide 103. However, the drive arm 68 will move considerably beneath the spacer 73 and the upper surface of the arm 68 will depart from the undersurface of the shelf or step 95. Consequently, when the guide 103 is in its extreme rearward position the amount of bight by the pawl on the ratchet wheel will be at a minimum. When the guide 103 is at its maximum forward position, it will clear all steps or shelves 96 of the spacer 73 and consequently the spring 81 will pull the pawl guide forward to its maximum position. Therefore, in this position the pawl 75 will take its largest bight and the floor conveyor will move at its maximum rate. Bolts 104 are provided to maintain the drive or slide 103 in any of a number of desired locations. It also becomes apparent therefore, that as the guide 103 is moved beneath any of the intermediate steps 96, the amount of bight by the pawl 75 will increase or decrease accordingly.

The rear end of the drive shaft extension 38 is coupled at 105 to a transmission drive shaft 106 journaled at 110 in the casing or housing 45. The coupling 105 is composed of a square-headed insert 107 fixed to the forward end of the shaft 106 and a flanged coupler element 108 fixed to the rear end of the shaft 38 and having a square opening for receiving the square insert 107. A second journal or bearing 111 also journals the shaft extension 106 in a head or cap casting 112 that closes the transmission housing. A sleeve 113, splined on its outer surface, is fixed to the end of the extension 38 and receives for axial sliding motion the hub of a jaw clutch 114. A spring 115 is positioned behind the jaw clutch 114 and normally biases the clutch 114 rearwardly. Journaled by a bearing 116 is a gear 117 having bevel teeth 118 facing rearwardly and a clutch surface 119 facing forwardly and engageable with the aforesaid jaw clutch 114.

The jaw clutch 114 is provided with a radial ledge or flange 125 facing rearwardly. Engaging the flange 125 is the outer end of an arm 126 fixed to an upright pin or shaft 127, the upper end of which extends outwardly of the casing or housing 45, and has connected thereto a radial lever or hand control 128. The spring 115 normally maintains the two clutches 114 and 119 in engagement. However, should it be desired to disengage the clutches and to stop the beater 15, such may be done by swinging the hand control or lever 128 so as to move the clutch 114 out of engagement with the clutch face 119. Supported on the outer end of the transverse beater shaft 18 is a bevel gear 130 engaging the bevel pinion 117. The shaft 18 is carried in a relatively long journal housing 131 which projects inwardly of the wall 12. A similar journal is provided on the opposite end of the shaft 18 and inwardly of the side wall 11. The entire casting or housing 45 is bolted to the respective side wall, the type of mounting being by bolts shown at 132. In this respect, it should be noted that the entire casting 45, shaft 78, and beater-widespread 15 are carried completely on side wall extensions 11a and 12a which are detachably connected to the main wall portions 11, 12 respectively by bolts 132.

Should it be desired to completely remove the beater mechanism 15 and the associated transmission housing 45, it is necessary only to detach the bolts 132. The extensions 11a, 12a are pivotally carried on their lower ends on the pivots 133, 134 respectively which connect forwardly extending brackets 135, 136 to the side walls 11, 12. The upper edges of wall extensions 11a, 12a and the upper edges of walls 11, 12 are rolled and the extensions 11a, 12a are provided with tubular inserts 137, 138 directed forwardly to be received in the rear ends of the rolled edges of the walls 11, 12. The journal blocks 48, 49 will maintain the rear shaft extension 38 and consequently the floor conveyors may remain in operation if desired. Consequently, the implement may be converted to and from a manure spreader and may also be used as a conventional type self-unloading wagon. The coupling 105 may be engaged and disengaged merely by raising or lowering the extensions 11a, 12a. Also, when used as a manure spreader, the beater 15 may be completely disengaged from operation by controlling the hand control lever 128 while the floor conveyor will remain in operation.

While only one form of the invention has been shown, it should be recognized that other forms and variations will become apparent to those skilled in the art. While the present disclosure was shown in concise and detailed manner, it was done so for the purpose of clearly and concisely illustrating the principles of the present invention. It should therefore be understood that in so describing the invention it was not intended to limit or narrow the invention beyond the broad concepts set forth in the appended claims.

What is claimed is:

1. In a material carrier: a mobile fore-and-aft extending container having front and rear ends and oppositely disposed fore-and-aft extending side walls interconnected at lower edges by a floor, the rear end of the container having a material discharge outlet; transverse beater means movably carried by the body above the floor at the outlet end and having a transverse beater shaft extending outwardly of at least one of said side walls; a floor conveyor adapted to engage material within the container and advance the material toward the outlet end; means associated with the floor conveyor including a transverse rotatable shaft for effecting operation of the floor conveyor with a projecting end thereof outwardly of the aforesaid side wall; a ratchet wheel mounted on the projecting end; a pawl carrier pivotally mounted on the projecting end; a drive pawl on the carrier engaging the ratchet wheel for advancing the floor conveyor; a stop pawl supported by the adjacent side wall engageable with the ratchet wheel for preventing movement of the floor conveyor in a direction opposite its advancement; a longitudinally extending rotatable drive shaft carried on the aforesaid side wall and extending from the front of the container rearwardly to the end portion of the beater shaft, said drive shaft being composed of front and rear axially alined portions in front of and rearwardly respectively of the pawl carrier and a crank portion eccentric to and interconnecting the front and rear portions; a connecting rod mounted on the eccentric portion and extending adjacent the pawl carrier; articulate connecting means between the connecting rod and the pawl carrier effecting reciprocating angular motion of the carrier about the projecting end of the conveyor shaft as the crank portion is rotated; and drive means between the rear portion of the longitudinal shaft and the beater shaft for effecting rotation of the latter in response to rotation of the former, said drive means having a clutch therein for selectively preventing rotation of the beater.

2. In a material carrier: a mobile fore-and-aft extending container having front and rear ends and oppositely disposed fore-and-aft extending side walls interconnected at lower edges by a floor, one of the ends of the container having a material discharge outlet; transverse beater means movably carried by the body above the floor at the outlet end and having a transverse beater shaft extending outwardly of at least one of said side walls; a floor conveyor adapted to engage material within the container and advance the material toward the outlet end; means associated with the floor conveyor including a transverse rotatable shaft for effecting operation of the floor conveyor with a projecting end thereof outwardly of the aforesaid side wall; a ratchet wheel mounted on the projecting end; a pawl carrier pivotally mounted on the projecting end; a drive pawl on the carrier engaging the ratchet wheel for advancing the floor conveyor; a longitudinally extending rotatable drive shaft carried on the aforesaid sidewall and extending longitudinally from one end portion adjacent the beater shaft, said drive shaft having a portion eccentric to the axis of the shaft; a connecting rod mounted on the eccentric portion and extending adjacent the pawl carrier; articulate connecting means between the connecting rod and the pawl carrier effecting reciprocating angular motion of the carrier about the projecting end of the conveyor shaft as the crank portion is rotated; and drive means between the longitudinal shaft and the beater shaft for effecting rotation of the latter in response to rotation of the former, said drive means having a clutch therein for selectively preventing rotation of the beater.

3. In a material carrier: a mobile container having opposite ends and oppositely disposed longitudinally extending side walls interconnected at lower edges by a floor, one of the ends of the container having a material discharge outlet; a floor conveyor adapted to engage material within the container and advance the material toward the outlet end; means associated with the floor conveyor including a transverse rotatable shaft for effecting operation of the floor conveyor with a projecting end thereof outwardly of the aforesaid side wall; a ratchet wheel mounted on the projecting end; a pawl carrier pivotally mounted on the projecting end; a drive pawl on the carrier engaging the ratchet wheel for advancing the floor conveyor; a longitudinally extending rotatable drive shaft carried on the aforesaid side wall and vertically spaced from the pawl carrier, said drive shaft having a portion eccentric to the axis of the shaft; a connecting rod mounted on the eccentric portion and extending adjacent the pawl carrier; and articulate connecting means between the connecting rod and the pawl carrier effecting reciprocating angular motion of the carrier about the projecting end of the conveyor shaft as the eccentric portion is rotated.

4. In a material carrier: a mobile container having opposite ends and oppositely disposed longitudinally extending side walls interconnected at lower edges by a floor, one of the ends of the container having a material discharge outlet; a floor conveyor adapted to engage material within the container and advance the material toward the outlet end; means associated with the floor conveyor including a transverse rotatable shaft for effecting operation of the floor conveyor with a projecting end thereof outwardly of the aforesaid side wall; intermittent drive means mounted on the projecting end for advancing the floor conveyor; a longitudinally extending rotatable drive shaft means carried on the aforesaid wall and vertically spaced from the intermittent drive means, said drive shaft means having a portion eccentric to the axis of the shaft means; a connecting rod mounted on the eccentric portion and extending adjacent the intermittent drive means; and articulate connecting means between the connecting rod and the intermittent drive means effecting advancement of the floor conveyor in response to rotation of the drive shaft means.

5. In a tractor-implement assembly in which the tractor is disposed forwardly of and is connected to the implement and has a rearwardly projecting power take-off shaft and the implement is a material unloader having a mobile fore-and-aft extending body with front and rear ends and oppositely disposed fore-and-aft extending side walls interconnected at lower edges by a floor, the rear end of the body having a material discharge outlet; transverse beater means movably carried by the body above the floor at the outlet end and having a transverse beater shaft extending outwardly of at least one of said side walls; and a floor conveyor adapted to engage material within the container and advance the material toward the outlet end, the improvement comprising: means associated with the floor conveyor including a transverse rotatable shaft for effecting operation of the floor conveyor with a projecting end thereof outwardly of the aforesaid side wall; a ratchet wheel mounted on the projecting end; a pawl carrier pivotally mounted on the projecting end; a drive pawl on the carrier engaging the ratchet wheel for advancing the floor conveyor; a longitudinally extending drive shaft carried on the aforesaid sidewall and extending from the front of the container rearwardly, said drive shaft being composed of front and rear axially alined portions in front of and rearwardly respectively of the pawl carrier and a crank portion eccentric to and interconnecting the front and rear portions; a connecting rod mounted on the eccentric portion and extending adjacent the pawl carrier; articulate connecting means between the connecting rod and the pawl carrier effecting reciprocating angular motion of the carrier about the projecting end of the conveyor shaft as the crank portion is rotated; drive means between the rear portion of the longitudinal shaft and the beater shaft for effecting rotation of the latter in response to rotation of the former, said drive means having a clutch therein for selectively preventing rotation of the beater; and a speed-reduction drive supported on the front end of the body adapted for connection to the power take-off shaft and operative to effect rotation of the longitudinal drive shaft.

6. In a tractor-implement assembly in which the tractor is disposed forwardly of and is connected to the implement and has a rearwardly projecting power take-off shaft and the implement is a material unloader having a mobile fore-and-aft extending body with front and rear ends and oppositely disposed fore-and-aft extending side walls interconnected at lower edges by a floor, one end of the body having a material discharge outlet; transverse beater means movably carried by the body above the floor at the outlet end and having a transverse beater shaft extending outwardly of at least one of said side walls; and a floor conveyor adapted to engage material within the container and advance the material toward the outlet end, the improvement comprising: means associated with the floor conveyor including a transverse rotatable shaft for effecting operation of the floor conveyor with a projecting end thereof outwardly of the aforesaid side wall; a ratchet wheel mounted on the projecting end; a pawl carrier pivotally mounted on the projecting end; a drive pawl on the carrier engaging the ratchet wheel for advancing the floor conveyor; a longitudinally extending drive shaft carried on the aforesaid side wall and extending from the front of the container rearwardly, said drive shaft having a crank portion eccentric to the main axis of the drive shaft; a connecting rod mounted on the eccentric portion and extending adjacent the pawl carrier; articulate connecting means between the connecting rod and the pawl carrier effecting reciprocating angular motion of the carrier about the projecting end of the conveyor shaft as the crank portion is rotated; drive means between the longitudinal shaft and the beater shaft for effecting rotation of the latter in response to rotation of the former, said drive means having a clutch therein for selectively preventing rotation of the beater; and a speed-reduction drive supported on the front end of the body adapted for connection to the power take-off shaft and operative to effect rotation of the longitudinal drive shaft.

7. The invention defined in claim 6 in which the drive means between the longitudinal shaft and beater shaft is in the form of a bevel gear drive supported within a transmission housing and the clutch is contained within the housing and is normally controlled by a control element extending through the housing.

8. In a tractor-implement assembly in which the tractor is disposed forwardly of and is connected to the implement and has a rearwardly projecting power take-off shaft and the implement is a material unloader having a mobile fore-and-aft extending body with front and rear ends and oppositely disposed fore-and-aft extending side walls interconnected at lower edges by a floor, one end of the body having a material discharge outlet; and a floor conveyor adapted to engage material within the container and advance the material toward the outlet end, the improvement comprising: means associated with the floor conveyor including a transverse rotatable shaft for effecting operation of the floor conveyor with a projecting end thereof outwardly of the aforesaid side wall; a ratchet wheel mounted on the projecting end; a pawl carrier pivotally mounted on the projecting end; a drive pawl on the carrier engaging the ratchet wheel for advancing the floor conveyor; a longitudinally extending drive shaft carried on the aforesaid side wall and extending from the front of the container rearwardly, said drive shaft having a crank portion eccentric to the main axis of the drive shaft; a connecting rod mounted on the eccentric portion and extending adjacent the pawl carrier; and articulate connecting means between the connecting rod and the pawl carrier effecting reciprocating angular motion of the carrier about the projecting end of the conveyor shaft as the crank portion is rotated.

9. The invention defined in claim 4 in which the intermittent drive means includes a ratchet wheel mounted on the projecting end of the transverse shaft, a pawl carrier pivotally mounted on the projecting end, a pawl on the carrier for engaging the ratchet wheel and the connecting rod is connected to the carrier by articulate connecting means.

10. The invention defined in claim 9 which part of the articulate connecting means is a ball and socket joint.

11. The invention defined in claim 10 in which a further part of the articulate connecting means is a radial arm supported for pivotal movement on the projecting end of the transverse shaft with the ball and socket joint being on the outer end of the arm, and the pawl carrier has abutment means thereon engaging the arm whereby movement of the arm will result in a movement of the carrier.

12. The invention defined in claim 11 further characterized by adjustment means for positioning the abutment means to effect the quantity of movement of the pawl carrier as a result of each stroke of the radial arm.

13. The invention defined in claim 4 in which the drive shaft is composed of a relatively long forward section and a rear extension section having thereon the crank portion and the two sections are connected by a detachable type coupling permitting the rear section to be detached from the forward section.

14. A material carrier comprising: a mobile fore-and-aft extending container having front and rear ends and oppositely disposed fore-and-aft extending side walls interconnected at lower edges by a floor, the rear end of the container having a material discharge outlet; a pair of rear side wall extensions detachably connected to the rear of the side walls; transverse beater means movably carried by the extension above the floor at the outlet and having a transverse beater shaft extending outwardly of at least one of said side wall extensions; a floor conveyor adapted to engage material within the container and advance the material toward the outlet end; means associated with the floor conveyor including a transverse rotatable shaft for effecting operation of the floor conveyor with a projecting end thereof outwardly of the aforesaid side wall; a ratchet wheel mounted on the projecting end; a drive pawl on the carrier engaging the ratchet wheel for advancing the floor conveyor; a stop pawl supported by the adjacent side wall engageable with the ratchet wheel for preventing movement of the floor conveyor in a direction opposite its advancement; a longitudinally extending rotatable drive shaft means carried on the aforesaid side wall and extending from the front of the container rearwardly to the end portion of the beater shaft, said drive shaft means having a crank portion eccentric to the main axis of the shaft and above the pawl carrier, said crank portion having a rear end adjacent the side wall extension; a connecting rod mounted on the eccentric portion and extending adjacent the pawl carrier; articulate connecting means between the connecting rod and the pawl carrier effecting reciprocating angular motion of the carrier about the projecting end of the conveyor shaft as the crank portion is rotated; and drive means between the rear end of the crank portion of the shaft and the beater shaft for effecting rotation of the latter in response to rotation of the former, said drive means having a clutch therein for selectively preventing rotation of the beater, and said drive means further having a coupler device automatically engageable with the rear end of the crank portion upon the extensions being in extending relation to the side walls.

15. A material carrier comprising: a mobile fore-and-aft extending container having front and rear ends and oppositely disposed fore-and-aft extending side walls interconnected at lower edges by a floor, the rear end of the container having a material discharge outlet; a pair of rear side wall extensions pivotally connected at their lower ends to the rear edges of the side walls; transverse beater means movably carried by the extension above the floor at the outlet and having a transverse beater shaft extending outwardly of at least one of said side wall extensions; a floor conveyor within the container; drive means for the floor conveyor including a shaft with a projecting end thereof outwardly of the aforesaid side wall; a ratchet wheel mounted on the projecting end; a drive pawl on the carrier engaging the ratchet wheel for advancing the floor conveyor; longitudinally extending rotatable drive shaft means carried on the aforesaid side wall and extending from the front of the container rearwardly to the end portion of the beater shaft, said drive shaft means having a crank portion eccentric to the main axis of the shaft and above the pawl carrier, said crank portion having a rear end adjacent the side wall extension; a connecting rod mounted on the eccentric portion and extending adjacent the pawl carrier; articulate connecting means between the connecting rod and the pawl carrier effecting motion of the carrier about the projecting end of the conveyor shaft as the crank portion is rotated; and drive means between the rear end of the crank portion of the shaft and the beater shaft for effecting rotation of the latter in response to rotation of the former, said drive means having a coupler device automatically engageable with the rear end of the crank portion upon the extensions swinging vertically about the lower pivots and in extending relation to the side walls.

16. A material carrier comprising: a mobile fore-and-aft extending container having front and rear ends and oppositely disposed fore-and-aft extending side walls interconnected at lower edges by a floor, the rear end of the container having a material discharge outlet; a pair of rear side wall extensions pivotally connected at their lower ends to the rear edges of the side walls; transverse beater means movably carried by the extension above the floor at the outlet and having a transverse beater shaft extending outwardly of at least one of said side wall extensions; a floor conveyor within the container; drive means for the floor conveyor including a conveyor shaft with a projecting end thereof outwardly of the aforesaid side wall; a pawl and ratchet drive mounted on the projecting end; longitudinally extending rotatable drive shaft means carried on the aforesaid side wall and extending from the front of the container rearwardly to the end portion of the beater shaft, said drive shaft means having a crank portion eccentric to the main axis of the shaft means and in vertical relation to the pawl carrier, said shaft means having a rear end adjacent the side wall extension; a connecting rod mounted on the eccentric portion; articulate connecting means between the connecting rod and the pawl and ratchet drive effecting rotation of the conveyor shaft as the crank portion is rotated; and drive means between the rear end of the shaft means and the beater shaft for effecting rotation of the latter in response to rotation of the former, said drive means having a coupler device automatically engageable with the rear end of the crank portion upon the extensions swinging vertically about the lower pivots and in extending relation to the side walls.

17. A material carrier comprising: a mobile fore-and-aft extending container having front and rear ends and oppositely disposed fore-aft extending side walls interconnected at lower edges by a floor, the rear end of the container having a material discharge outlet; a pair of rear side wall extensions pivotally connected at their lower ends to the rear edges of the side walls; transverse beater means movably carried by the extention above the floor at the outlet and having a transverse beater shaft extending outwardly of at least one of said side wall extensions; a floor conveyor within the container; drive means for the floor conveyor including a conveyor shaft with a projecting end thereof outwardly of the aforesaid side wall; a pawl and ratchet drive mounted on the projecting end; longitudinally extending rotatable drive shaft means carried on the aforesaid side wall and extending from the front of the container rearwardly to the end portion of the beater shaft, said drive shaft means having a rear end adjacent the side wall extension; means connecting the shaft means and the pawl and ratchet drive effecting rotation of the conveyor shaft as the shaft means is rotated; and drive means between the rear end of the shaft means and the beater shaft for effecting rotation of the latter in response to rotation of the former, said drive means having a coupler device automatically engageable with the rear end of the shaft means upon the extensions swinging vertically about the lower pivots and in extending relation to the side walls.

References Cited in the file of this patent

UNITED STATES PATENTS

| | | | |
|---|---|---|---|
| 898,934 | Shields | Sept. 15, | 1908 |
| 1,218,866 | Jirdinston | Mar. 13, | 1917 |
| 2,597,052 | Barker | May 20, | 1952 |
| 2,774,495 | Regier | Dec. 18, | 1956 |

FOREIGN PATENTS

| | | | |
|---|---|---|---|
| 199,407 | Austria | Sept. 10, | 1958 |
| 845,118 | Germany | July 28, | 1952 |